US012544902B2

(12) United States Patent
Shimizu et al.

(10) Patent No.: US 12,544,902 B2
(45) Date of Patent: Feb. 10, 2026

(54) ELECTRIC TOOL

(71) Applicant: PANASONIC HOLDINGS CORPORATION, Osaka (JP)

(72) Inventors: Hidenori Shimizu, Shiga (JP); Shinji Seko, Mie (JP); Takashi Kusagawa, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

(21) Appl. No.: 18/855,559

(22) PCT Filed: Apr. 5, 2023

(86) PCT No.: PCT/JP2023/014053
§ 371 (c)(1),
(2) Date: Oct. 9, 2024

(87) PCT Pub. No.: WO2023/199811
PCT Pub. Date: Oct. 19, 2023

(65) Prior Publication Data

US 2025/0262741 A1 Aug. 21, 2025

(30) Foreign Application Priority Data

Apr. 11, 2022 (JP) ................................ 2022-065394

(51) Int. Cl.
*B25F 5/02* (2006.01)
*B25F 5/00* (2006.01)
*B25B 21/02* (2006.01)

(52) U.S. Cl.
CPC ................ *B25F 5/02* (2013.01); *B25F 5/001* (2013.01); *B25B 21/02* (2013.01)

(58) Field of Classification Search
CPC ..... B25B 21/02; B25B 21/023; B25B 21/026; B25F 5/001; B25F 5/02
See application file for complete search history.

(56) References Cited

U.S. PATENT DOCUMENTS

2019/0262978 A1* 8/2019 Tejima .................. B25B 21/026
2020/0282539 A1* 9/2020 Ikuta ...................... B23D 51/10
(Continued)

FOREIGN PATENT DOCUMENTS

CN 1765590 A 5/2006
EP 2471632 B1 12/2015
(Continued)

OTHER PUBLICATIONS

International Search Report dated Jun. 27, 2023 issued in International Patent Application No. PCT/JP2023/014053, with English translation.

(Continued)

*Primary Examiner* — Himchan Song
(74) *Attorney, Agent, or Firm* — Rimon P.C.

(57) ABSTRACT

An electric tool includes an output shaft, a drive shaft, a transmission mechanism, a plurality of bearings, and a seal member. The plurality of bearings are aligned in an axial direction of the output shaft and rotatably support the output shaft. The seal member has a through hole into which the output shaft is inserted. The seal member is disposed, in at least one space of spaces each sandwiched between each two adjacent bearings of the plurality of bearings, such that an inner circumferential surface of the through hole is in contact with the outer circumferential surface of the output shaft.

20 Claims, 7 Drawing Sheets

(56) References Cited

U.S. PATENT DOCUMENTS

| | | | | |
|---|---|---|---|---|
| 2021/0187717 A1* | 6/2021 | McClung | B25B 21/02 |
| 2022/0040829 A1* | 2/2022 | Schneider | B25B 21/026 |
| 2022/0111497 A1* | 4/2022 | Sano | B25B 21/02 |
| 2022/0193878 A1* | 6/2022 | Tomayko | B25B 21/02 |
| 2022/0266438 A1* | 8/2022 | Machida | B25F 5/001 |
| 2023/0202018 A1* | 6/2023 | Taylor | B25B 21/02 173/216 |

FOREIGN PATENT DOCUMENTS

| | | |
|---|---|---|
| JP | S58-091232 U | 6/1983 |
| JP | 2004-232767 A | 8/2004 |
| JP | 5525386 B2 | 6/2014 |
| JP | 2019-141984 A | 8/2019 |

OTHER PUBLICATIONS

Extended European Search Report dated Jul. 4, 2025, from corresponding European Patent Application No. 23788230.3.

* cited by examiner

ELECTRIC TOOL

CROSS-REFERENCE OF RELATED APPLICATIONS

This application is the U.S. National Phase under 35 U.S.C. § 371 of International Patent Application No. PCT/JP2023/014053, filed on Apr. 5, 2023, which in turn claims the benefit of Japanese Patent Application No. 2022-065394, filed on Apr. 11, 2022, the entire disclosures of which Applications are incorporated by reference herein.

TECHNICAL FIELD

The present disclosure generally relates to electric tools. The present disclosure specifically relates to an electric tool including an output shaft.

BACKGROUND ART

Patent Literature 1 discloses an impact rotary tool including: a driver having a motor: an output configured to output rotary driving of the driver; and an impactor configured to transmit the rotary driving of the driver to the output together with an impact movement. The impactor includes: a hammer configured to be rotated by the driver; an anvil having an impact receiving surface impacted by the hammer and configured to transmit the rotary driving to the output; and a buffer member attached to the anvil and having lower stiffness than the anvil. The buffer member protrudes beyond the impact receiving surface in a rotational direction of the anvil.

An electric tool, such as the impact rotary tool described above, may include a seal member provided therein, and the seal member is required to have high durability.

CITATION LIST

Patent Literature

Patent Literature 1: JP 5525386 B2

SUMMARY OF INVENTION

It is an object of the present disclosure to provide an electric tool including a seal member with high durability.

An electric tool according to an aspect of the present disclosure includes an output shaft, a drive shaft, a transmission mechanism, a plurality of bearings, and a seal member. The output shaft includes a holder configured to hold a tip tool. The drive shaft is configured to be rotated by a driver. The transmission mechanism is disposed between the drive shaft and the output shaft to transmit rotation of the drive shaft to the output shaft. The plurality of bearings are aligned in an axial direction of the output shaft to rotatably support the output shaft. The seal member has a through hole in which the output shaft is inserted. The seal member is disposed, in at least one space of spaces each between two adjacent bearings of the plurality of bearings, such that an inner circumferential surface of the through hole is in contact with an outer circumferential surface of the output shaft.

DESCRIPTION OF EMBODIMENTS

With reference to the drawings, an electric tool according to an embodiment will be described below. Note that the embodiment described below is a mere example of various embodiments of the present disclosure. Various modifications may be made to the embodiment described below depending on design or the like as long as the object of the present disclosure is achieved. Moreover, figures described in the following embodiment are schematic views. The ratio of sizes and the ratio of thicknesses of components in the figures do not necessarily reflect actual dimensional ratios.

(1) First Embodiment

(1-1) Overview

The overview of an electric tool 1 according to a first embodiment will be described below with reference to FIG. 1.

Figure 1:
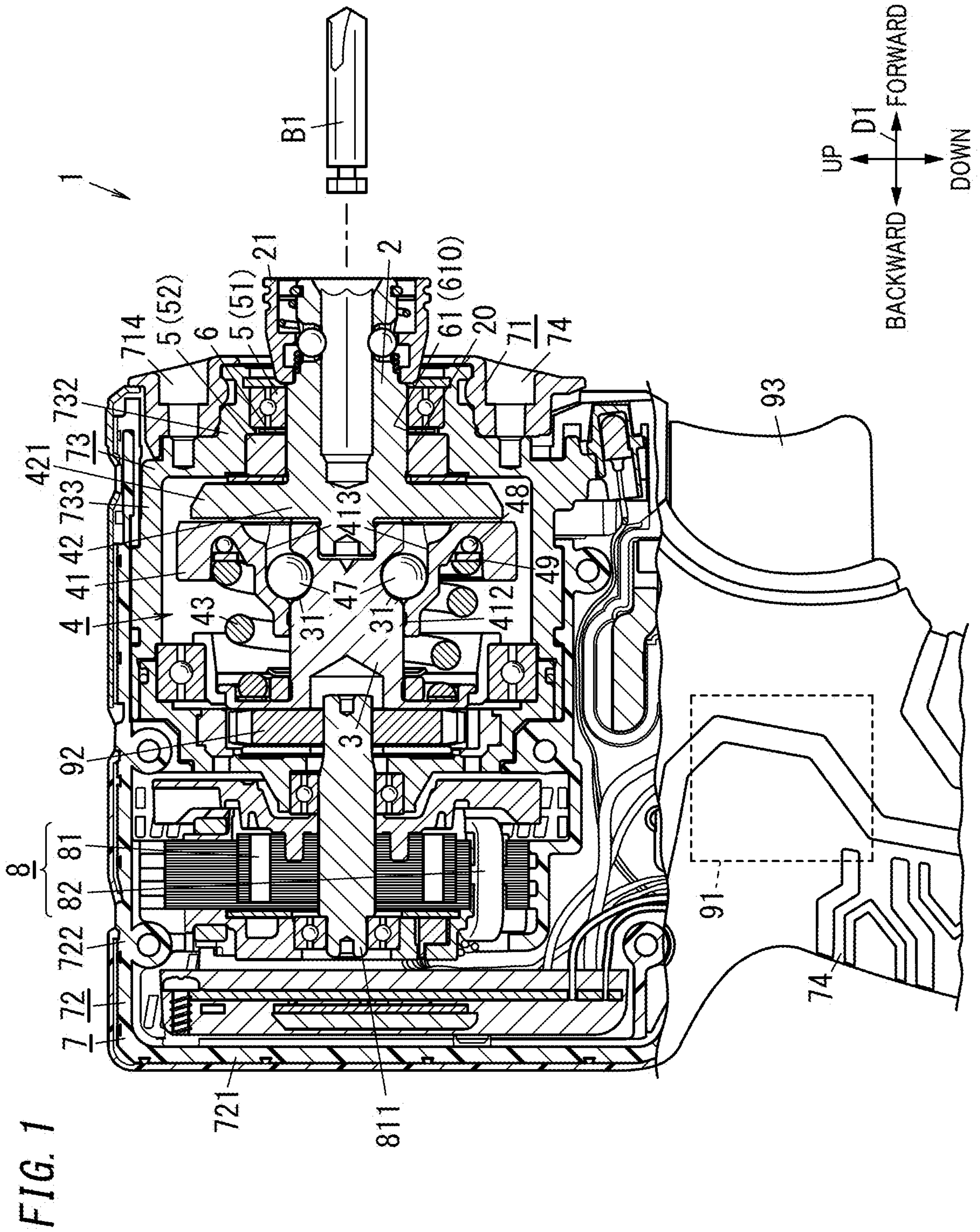
FIG. 1 is a sectional view of a main part of an electric tool according to an embodiment.

As shown in FIG. 1, the electric tool 1 according to the first embodiment includes an output shaft 2, a drive shaft 3, a transmission mechanism 4, a plurality of bearings 5, and a seal member 6. A worker is assumed to use the electric tool 1 to perform a fastening operation of fastening a fastening part (such as a screw, a bolt, or a nut) to a work target (such as an electric appliance or furniture). Moreover, the electric tool 1 may be used by the worker to perform a removal operation of loosening a fastening part from a work target.

The output shaft 2 includes a holder 21 configured to hold a tip tool B1. The drive shaft 3 is rotated by a driver 8. The transmission mechanism 4 is disposed between the drive shaft 3 and the output shaft 2 to transmit rotation of the drive shaft 3 to the output shaft 2. The plurality of bearings 5 are aligned in an axial direction D1 of the output shaft 2 to rotatably support the output shaft 2. The seal member 6 has a through hole 61 into which the output shaft 2 is inserted. The seal member 6 is disposed, in at least one space of spaces between each two adjacent bearings 5 of the plurality of bearings 5, such that an inner circumferential surface 610 of the through hole 61 is in contact with an outer circumferential surface 20 of the output shaft 2.

In the electric tool 1 of the first embodiment, the output shaft 2 is supported by the plurality of bearings 5. Therefore, when the rotation of the drive shaft 3 is transmitted to the output shaft 2 from the transmission mechanism 4 and the output shaft 2 rotates along the axial direction D1, the output shaft 2 can be suppressed from moving in a direction intersecting the axial direction D1. That is, the electric tool 1 of the first embodiment can reduce a rotational shake when the output shaft 2 rotates along the axial direction D1.

Therefore, the first embodiment suppresses the rotational shake from pushing the output shaft 2 against the seal member 6 disposed in the space between the adjacent bearings 5. As a result, the electric tool 1 of the first embodiment provides the effect of suppressing the seal member 6 from being abraded by the output shaft 2. That is, the electric tool 1 of the first embodiment has the advantages that the seal member 6 has high durability. As used herein, the "durability" is a property representing an extent to which the electric tool 1 is suppressed from deteriorating, for example, being abraded, over time of use.

(1-2) Detailed Configuration

(1-2-1) Overall Configuration

A detailed configuration of the electric tool 1 of the first embodiment will be described below with reference to FIG. 1 to FIG. 6.

As shown in FIG. 1, the electric tool 1 includes the output shaft 2, the drive shaft 3, the transmission mechanism 4, the plurality of bearings 5, the seal member 6, and a housing 7, a driver 8, a controller 91, a planet gear mechanism 92, and an operating member 93.

In the following description, the axial direction D1 of the output shaft 2 is defined as a forward/backward direction, wherein an anvil 42 is forward of a hammer 41 and the hammer 41 is backward of the anvil 42. Moreover, in the following description, a direction in which a second part 72 which will be described later and a grip 74 which will be described later are aligned with each other is defined as an up/down direction (Y direction in FIG. 2), wherein the second part 72 is upward of the grip 74 and the grip 74 is downward of the second part 72. Moreover, a direction orthogonal to the forward/backward direction and the up/down direction is defined as a left/right direction. Note that these definitions do not intend to define a direction in which the electric tool 1 is used.

(1-2-2) Housing

Figure 2:
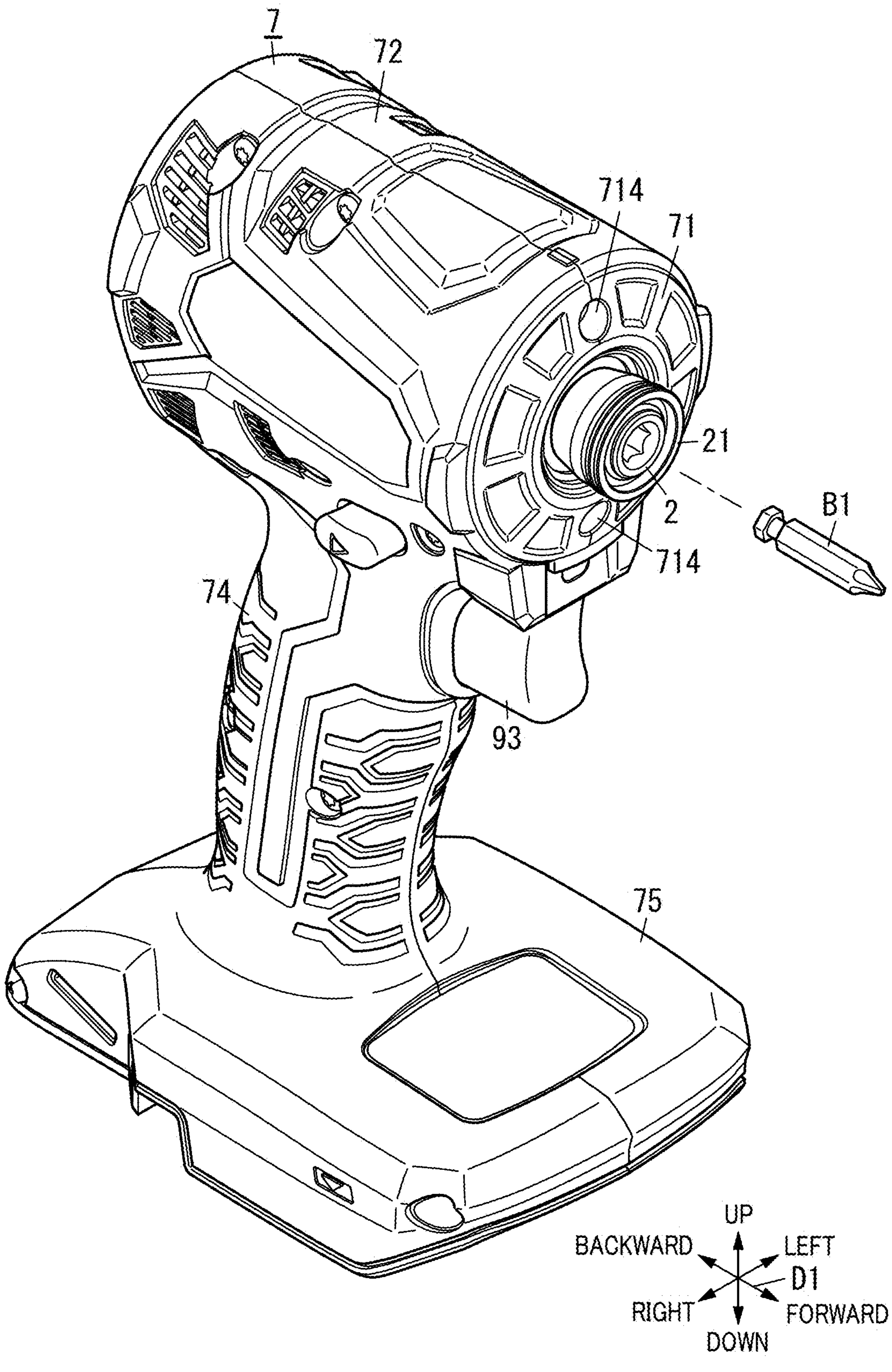
FIG. 2 is an exterior perspective view of the electric tool.

As shown in FIG. 1, the housing 7 houses at least part of the output shaft 2, the drive shaft 3, the transmission mechanism 4, the plurality of bearings 5, the seal member 6, the driver 8, the controller 91, and the planet gear mechanism 92. As shown in FIGS. 1 and 2, the housing 7 includes a first part 71, the second part 72, a third part 73, the grip 74, and a battery applied part 75.

(First Part)

Figure 3:
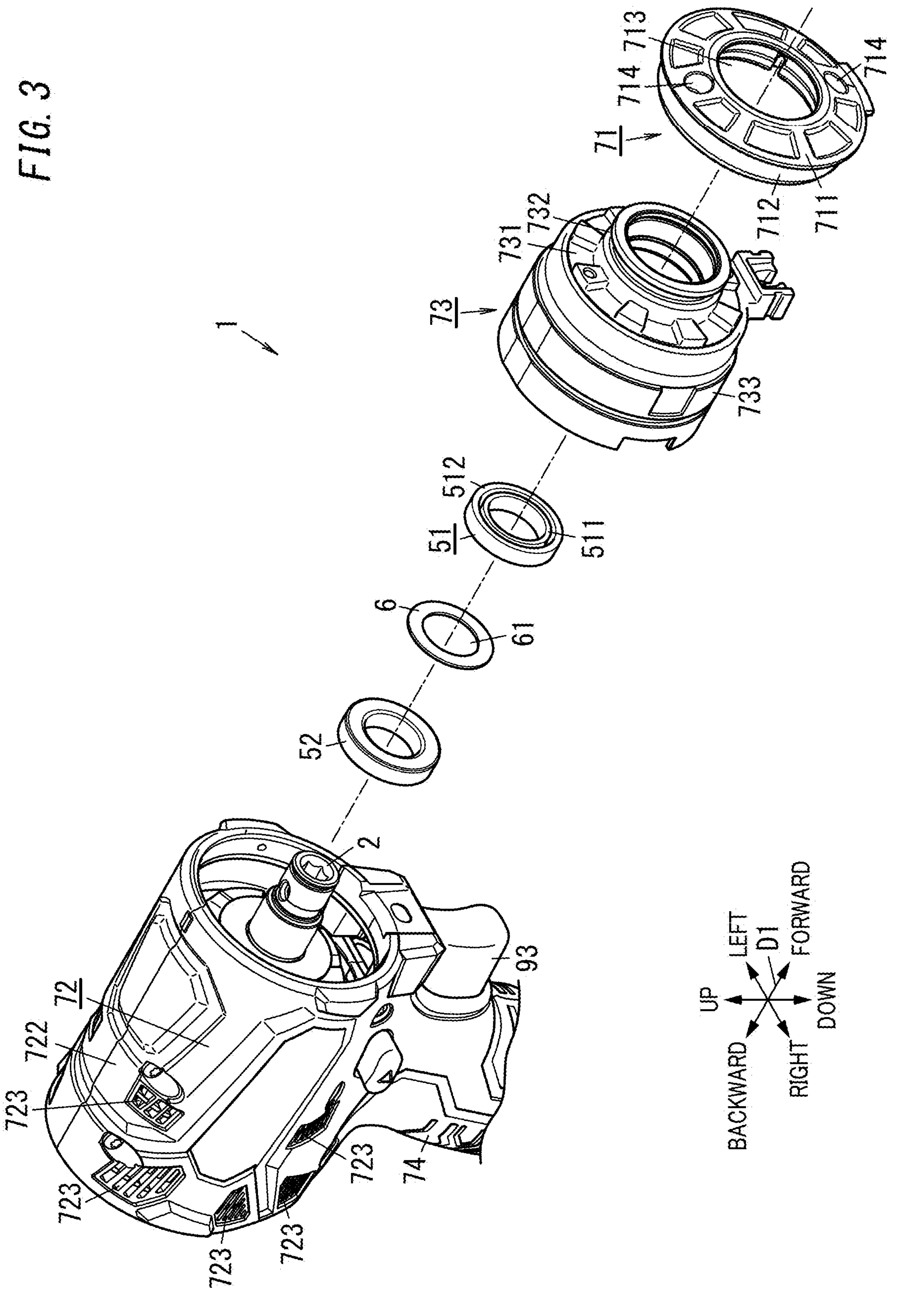
FIG. 3 is an exploded perspective view of the main part of the electric tool.
Figure 4:
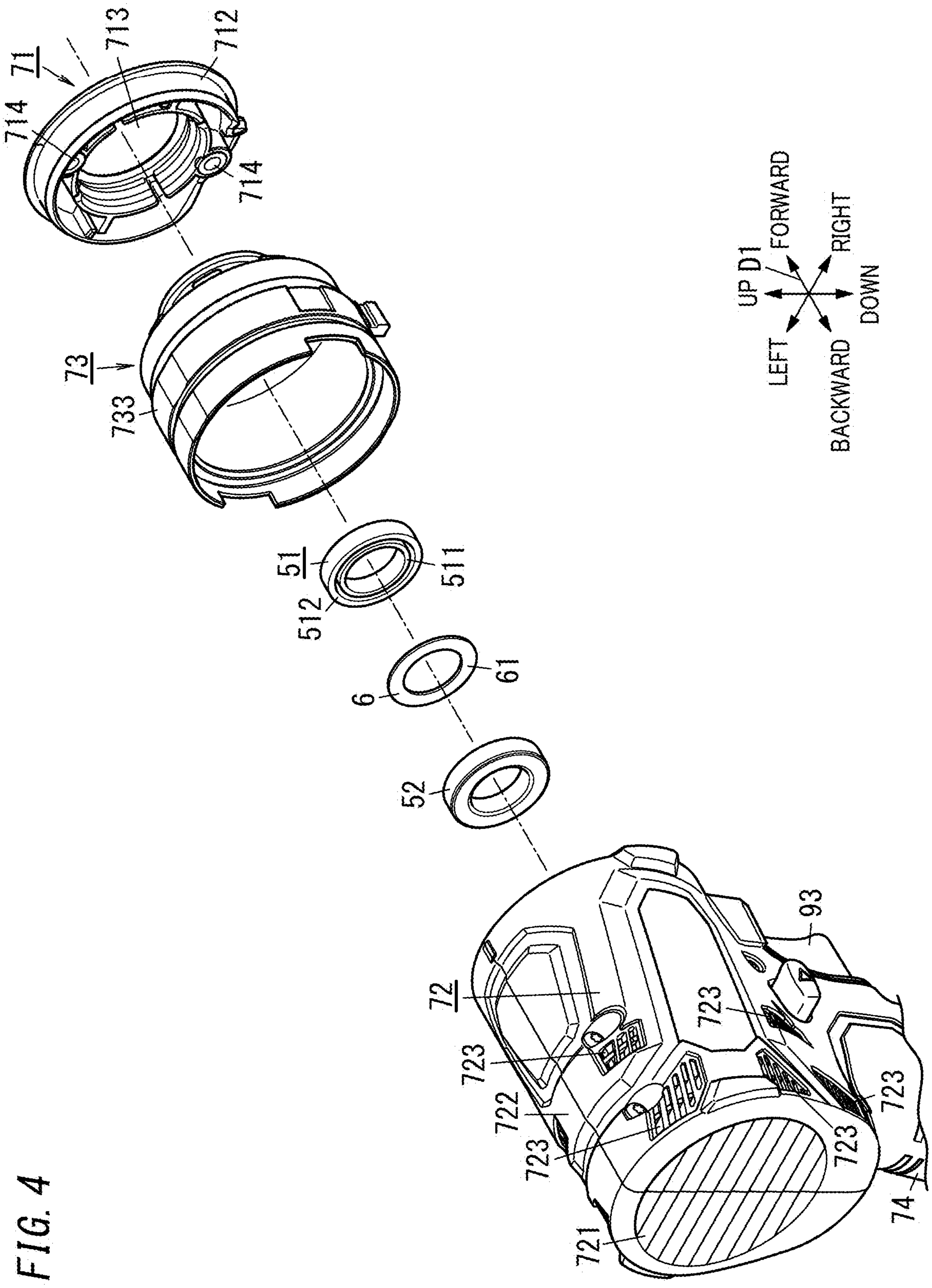
FIG. 4 is an exploded perspective view of the main part of the electric tool.

As shown in FIGS. 3 and 4, the first part 71 includes a first bottom part 711 and a first side part 712. The first bottom part 711 has a disk shape. A thickness direction defined with respect to the first bottom part 711 is parallel to the forward/backward direction. The first bottom part 711 has a through hole 713 formed in the forward/backward direction. The through hole 713 is at the center of the first bottom part 711. The output shaft 2 is inserted into the through hole 713. The first side part 712 protrudes backward from a circumferential edge of the first bottom part 711.

(Second Part)

As shown in FIGS. 3 and 4, the second part 72 includes a second bottom part 721 and a second side part 722. The second bottom part 721 has an elliptical plate shape. A thickness direction defined with respect to the second bottom part 721 is parallel to the forward/backward direction.

The second side part 722 has a circularly cylindrical shape. The second side part 722 protrudes forward from a circumferential edge of the second bottom part 721.

As shown in FIG. 1, the second side part 722 has a front opening covered with the first part 71. More specifically, the front opening of the second side part 722 is covered with the first part 71 such that a front part of an inner surface of the second side part 722 is in close contact with an outer surface of the first side part 712, and a front end part of the second side part 722 is in contact with a circumferential edge part of the first bottom part 711.

As shown in FIGS. 3 and 4, the second part 72 has a plurality of ventilation holes 723 formed in the second side part 722. More specifically, the second part 72 has the plurality of ventilation holes 723 provided at a back portion of the second side part 722.

(Third Part)

As shown in FIGS. 3 and 4, the third part 73 includes a main part 731, a cylindrical part 732, and a third side part 733. The main part 731 is a circularly annular plate member. The thickness direction defined with respect to the main part 731 is parallel to the forward/backward direction.

As shown in FIGS. 3 and 4, the cylindrical part 732 has a circularly cylindrical shape with openings at both ends thereof. The cylindrical part 732 protrudes forward from an inner edge of the main part 731. As shown in FIG. 1, the cylindrical part 732 of the first embodiment houses the plurality of bearings 5 and the seal member 6. The output shaft 2 is inserted in the cylindrical part 732.

Figure 5:
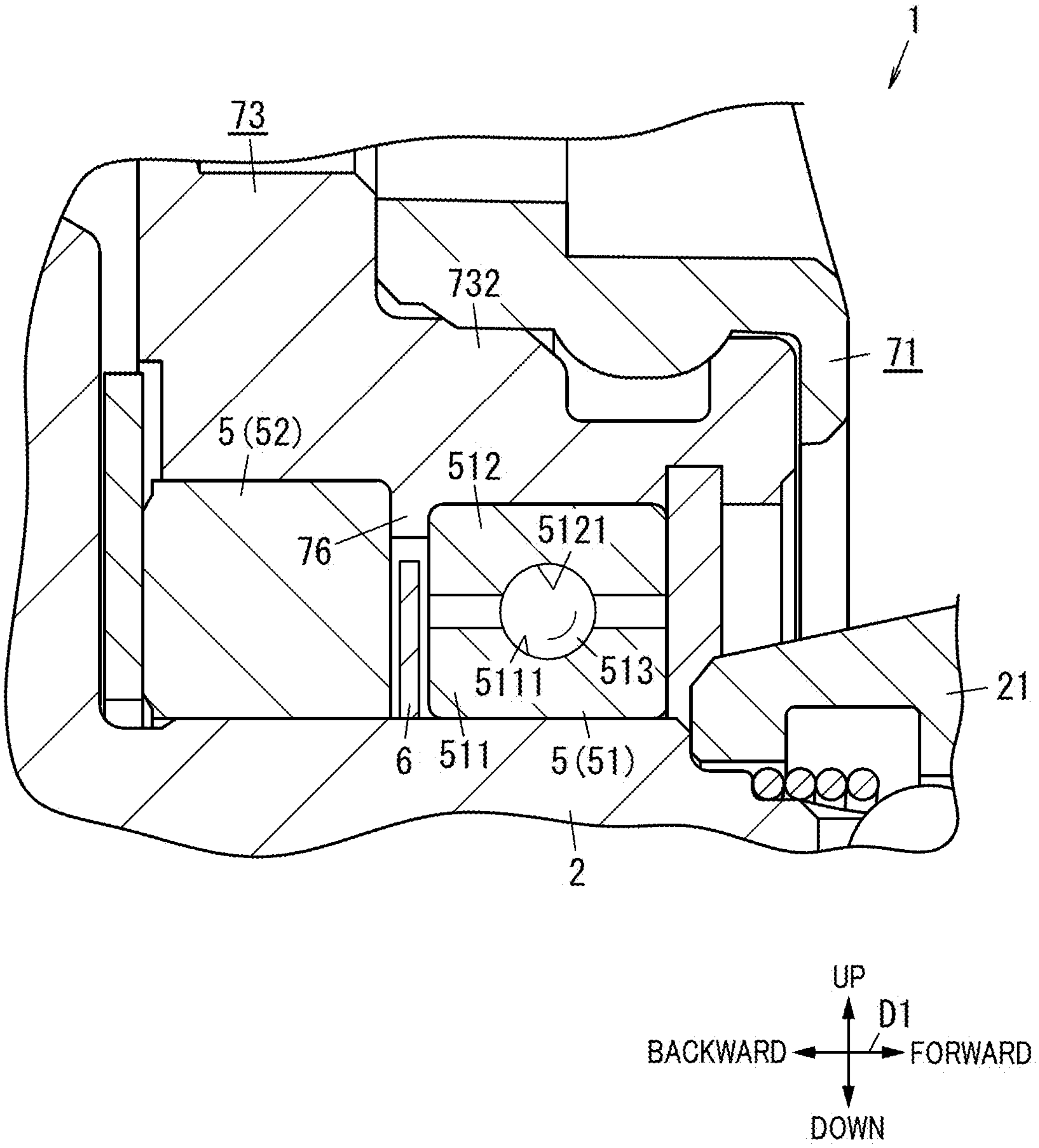
FIG. 5 is an enlarged sectional view of the main part of the electric tool.

As shown in FIGS. 1 and 5, the cylindrical part 732 supports the plurality of bearings 5. In other words, the housing 7 supports the plurality of bearings 5. The cylindrical part 732 has an inner diameter substantially equal to an outer shape of each of the plurality of bearings 5 or is slightly larger than the outer shape of each of the plurality of bearings 5. As a result, each of the plurality of bearings 5 is fitted in the cylindrical part 732, and thereby, the cylindrical part 732 supports the plurality of bearings 5.

As shown in FIG. 5, the cylindrical part 732 has a projection 76. In other words, the housing 7 has the projection 76 at the cylindrical part 732. The projection 76 protrudes from an inner circumferential surface of the cylindrical part 732 toward the output shaft 2. The projection 76 extends, one circle, on the inner circumferential surface of the cylindrical part 732 along the circumferential direction of the cylindrical part 732. That is, the projection 76 is circularly annularly provided on the inner circumferential surface of the cylindrical part 732. The projection 76 is located in a space which is one of the spaces each between two adjacent bearings 5 of the plurality of bearings 5 and in which the seal member 6 is provided. This configuration provides the advantage that a gap between each two adjacent bearings 5 can be easily maintained, so that the seal member 6 is easily provided.

As shown in FIGS. 3 and 4, the third side part 733 has a circularly cylindrical shape. The third side part 733 protrudes backward from an outer edge of the main part 731. As shown in FIG. 1, the third side part 733 of the first embodiment houses at least part of the drive shaft 3 and the transmission mechanism 4. As shown in FIG. 1, the third side part 733 has an outer surface closely in contact with the inner surface of the second side part 722 of the second part 72.

To the third part 73, the first part 71 is attached. More specifically, the first part 71 is attached to the third part 73 such that a front end part of the cylindrical part 732 borders the through hole 713 formed in the first bottom part 711 of the first part 71.

(Grip)

The grip 74 protrudes from the second part 72. More specifically, the grip 74 protrudes downward from the second part 72 as shown in FIG. 2. The worker can hold the grip 74 to perform an operation such as fastening a screw.

(Battery Applied Part)

The battery applied part 75 is in the shape of a substantially rectangular parallelepiped. As shown in FIG. 2, the battery applied part 75 is connected to a lower end of the grip 74. To the battery applied part 75, a rechargeable battery pack is detachably attached. The electric tool 1 operates by using the battery pack as a power supply. That is, the battery pack is a power supply which supplies a current for driving the driver 8. The battery pack is not a component of the electric tool 1. However, the electric tool 1 may include the battery pack. The battery pack includes: an assembled battery including a plurality of secondary batteries (e. g., lithium ion batteries) connected to each other in series: and a case housing the assembled battery.

(1-2-3) Driver

As shown in FIG. 1, the driver 8 is housed at a back portion in the second part 72. The driver 8 includes: a rotor 81 including a rotary shaft 811 and a permanent magnet; and a stator 82 including a coil. Electromagnetic interaction between the permanent magnet and the coil rotates the rotor 81 with respect to the stator 82.

Moreover, the driver 8 is a servomotor. The torque and the rotational velocity of the driver 8 vary in accordance with control by the controller 91 (servo driver). More specifically, the controller 91 controls operation of the driver 8 by feedback control of controlling such that the torque and the rotational velocity of the driver 8 approximate target values.

(1-2-4) Drive Shaft

The drive shaft 3 is connected to the rotary shaft 811 via the planet gear mechanism 92. As a result, the drive shaft 3 rotates along with the rotary shaft 811 of the driver 8. That is, the drive shaft 3 is rotated by the driver 8.

The planet gear mechanism 92 converts the rotational velocity and the torque of the rotary shaft 811 of the driver 8 into a rotational velocity and torque which are required for screw turning operation. The planet gear mechanism 92 is a decelerator. The torque of the rotary shaft 811 of the driver 8 is transmitted via the planet gear mechanism 92 to the drive shaft 3.

(1-2-5) Transmission Mechanism

As shown in FIG. 1, the transmission mechanism 4 is housed in the third part 73 of the housing 7. The transmission mechanism 4 of the first embodiment includes an impact mechanism. That is, the electric tool 1 of the first embodiment is an electrically driven impacting tool which performs the fastening operation while performing impact operation by the impact mechanism. The impact mechanism generates, based on motive power of the driver 8, an impacting force during the impact operation and applies the impacting force to the tip tool B1.

As shown in FIG. 1, the transmission mechanism 4 of the first embodiment further includes a hammer 41, an anvil 42, an elastic member 43, and two balls (first balls) 47. The torque transmitted to the drive shaft 3 is transmitted to the hammer 41. This rotates the hammer 41. The torque of the hammer 41 is transmitted to the anvil 42. This rotates the anvil 42.

Figure 6:
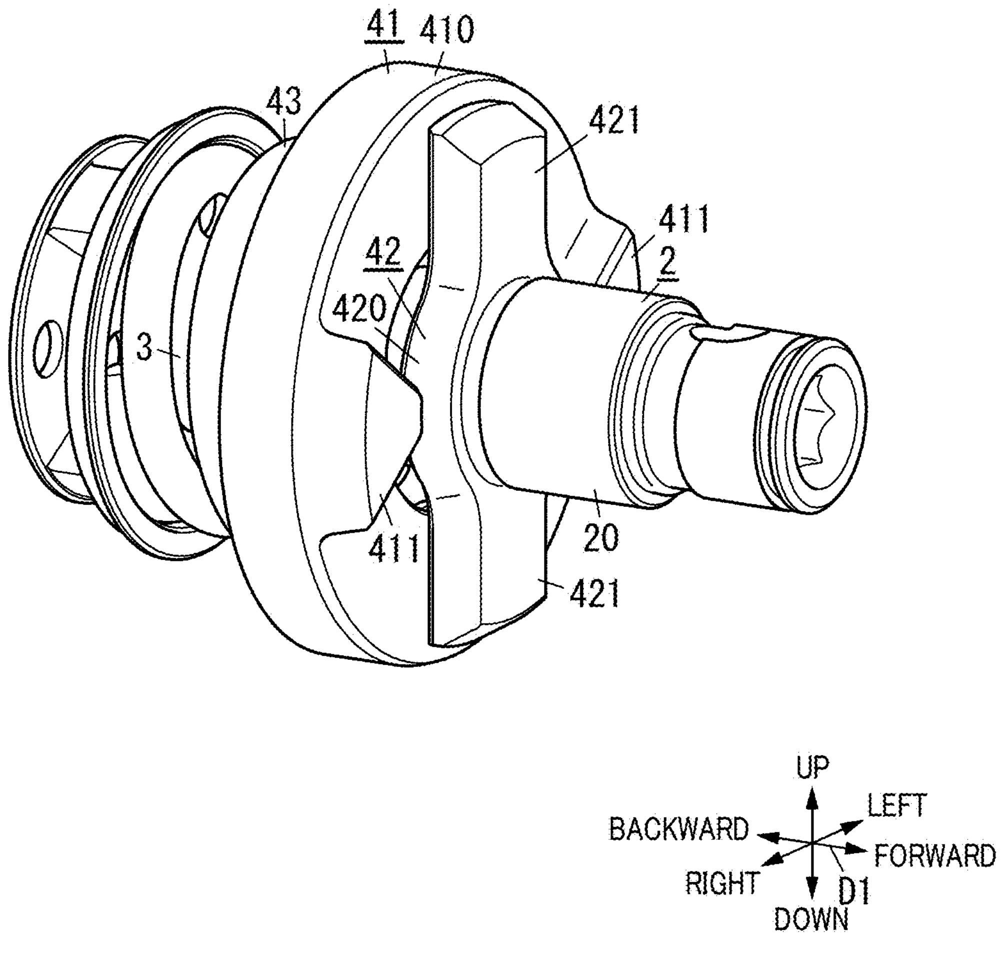
FIG. 6 is a perspective view of a main part of the electric tool.

The hammer 41 moves with respect to the anvil 42 and receives the motive power from the driver 8 to apply the impacting force to the anvil 42. As shown in FIG. 6, the hammer 41 includes a hammer body 410 and a plurality of (in this embodiment, two) hammer projections 411. The hammer body 410 has a columnar shape. The hammer 41 is provided with the plurality of hammer projections 411 on the hammer body 410. The plurality of hammer projections 411 protrude from a surface of the hammer body 410 facing the anvil 42. The plurality of hammer projections 411 are disposed in the circumferential direction of the hammer body 410 at substantially equal intervals. When viewed from the front of the hammer 41, the plurality of hammer projections 411 each have a fan shape.

As shown in FIG. 1, the hammer body 410 has a through hole 412 in which the drive shaft 3 is inserted. More specifically, the through hole 412 is fitted to an outer circumferential surface of the drive shaft 3 such that the through hole 412 is movable in an axial direction of the drive shaft 3 and is rotatable in a rotational direction of the drive shaft 3. That is, the hammer 41 is fitted to the outer circumferential surface of the drive shaft 3 such that the hammer 41 is rotatable and movable forward and backward.

The hammer body 410 has two grooves 413 in an inner circumferential surface of the through hole 412. The drive shaft 3 has two grooves 31 in the outer circumferential surface thereof. The two grooves 31 may be connected to each other. Between the two grooves 413 and the two grooves 31, two first balls 47 are sandwiched. The two grooves 413, the two grooves 31, and the two first balls 47 constitute a cam mechanism. The hammer 41 is movable with respect to the drive shaft 3 in the axial direction (forward/backward direction) of the drive shaft 3 and is rotatable with respect to the drive shaft 3 while the two first balls 47 move in the grooves 413 and the grooves 31. As the hammer 41 moves along the axial direction of the drive shaft 3 in a direction toward the anvil 42 or in a direction away from the anvil 42, the hammer 41 rotates with respect to the drive shaft 3.

The anvil 42 is mechanically connected to the output shaft 2. In the first embodiment, the anvil 42 is integral with the output shaft 2 as shown in FIGS. 1 and 6. The anvil 42 rotates together with the output shaft 2. As shown in FIG. 6, the anvil 42 includes an anvil body 420 and a plurality of (two) anvil projections 421. The anvil body 420 has a circularly annular shape. The anvil body 420 faces the hammer body 410 in the forward/backward direction. The plurality of anvil projections 421 protrude from the anvil body 420 in a radial direction of the anvil body 420. The number of anvil projections 421 is equal to the number of hammer projections 411. The plurality of anvil projections 421 are engageable with the plurality of hammer projections 411.

When the impact mechanism does not perform the impact operation, the hammer 41 and the anvil 42 rotate together while the plurality of hammer projections 411 are in contact with the plurality of anvil projections 421 in the rotational direction of the drive shaft 3. Therefore, at this time, the drive shaft 3, the hammer 41, the anvil 42, and the output shaft 2 rotate together.

As shown in FIG. 1, the elastic member 43 is sandwiched between the hammer 41 and the planet gear mechanism 92. The elastic member 43 of the present embodiment is a conical coil spring. The transmission mechanism 4 further includes: a plurality of (in FIG. 1, two) balls (second balls) 48 sandwiched between the hammer 41 and the elastic member 43; and a ring 49. Thus, the hammer 41 is rotatable with respect to the elastic member 43. The hammer 41 receives a force toward the output shaft 2 (a forward force) from the elastic member 43 in a direction along the axial direction D1 of the output shaft 2.

In the following description, it is referred to as "the hammer 41 moves forward" that that the hammer 41 moves in the axial direction D1 of the output shaft 2 toward the output shaft 2. Moreover, in the following description, it is referred to as "the hammer 41 moves backward" that the hammer 41 moves in the axial direction D1 of the output shaft 2 away from the output shaft 2.

The impact mechanism performs the impact operation when a torque condition regarding the magnitude of torque applied to the output shaft 2 (hereinafter referred to as load torque) is satisfied. The impact operation is an operation of applying the impacting force from the hammer 41 to the anvil 42. In the present embodiment, the torque condition is that the load torque increases to be greater than a prescribed value. That is, as the load torque increases, a component of a force which is generated between the hammer 41 and the anvil 42 and which moves the hammer 41 backward also increases. When the load torque increases to be greater than or equal to the prescribed value, the hammer 41 moves backward while compressing the elastic member 43. Then, the hammer 41 moves backward, and thereby, the hammer 41 rotates while the plurality of hammer projections 411 climb over the plurality of anvil projections 421. Thereafter, the hammer 41 receives a return force from the elastic member 43 to move forward. Then, when the drive shaft 3 makes a substantially half turn, the plurality of hammer projections 411 collide with side surfaces of the plurality of anvil projections 421. In the impact mechanism, each time the drive shaft 3 makes a substantially half turn, the plurality of hammer projections 411 collide with the plurality of anvil projections 421. That is, each time the drive shaft 3 makes a substantially half turn, the hammer 41 applies the impacting force (rotational striking force) to the anvil 42.

Thus, in the impact mechanism, the hammer 41 repeatedly collides with the anvil 42. The torque resulting from the collision enables a fastening part to be tightly fastened as compared with the case without the collision.

(1-2-6) Output Shaft

As shown in FIG. 6, the output shaft 2 has a columnar shape. The axial direction D1 of the output shaft 2 is the forward/backward direction. The output shaft 2 protrudes forward from the anvil body 420.

The output shaft 2 is inserted into the through hole 713 formed in the first part and the cylindrical part 732 of the third part 73. The output shaft 2 has a front portion protruding from the through hole 713 formed in the first part. That is, the front portion of the output shaft 2 is exposed outside the housing 7.

As shown in FIG. 1, the output shaft 2 has the holder 21 configured to hold the tip tool B1. The holder 21 is provided at an end of the output shaft 2 protruding from the through hole 713 formed in the first part. That is, the holder 21 is provided at a front end of the output shaft 2. The output shaft 2 is rotated together with the tip tool B1 by the driver 8.

In the present embodiment, the tip tool B1 (see FIGS. 1 and 2) is detachably attached to the holder 21 via a chuck. Note that the tip tool B1 may be detachably attached directly to the holder 21. Alternatively, the holder 21 and the tip tool B1 may be formed integrally with each other. The tip tool B1 is, for example, a driver bit. The tip tool B1 fitted in the fastening part rotates, thereby enabling an operation such as fastening or loosening the fastening part.

(1-2-7) Bearing

The plurality of bearings 5 rotatably support the output shaft 2. In other words, the plurality of bearings 5 pivotally support the output shaft 2. Specifically, the plurality of bearings 5 are fit between the cylindrical part 732 of the housing 7 and the output shaft 2, thereby rotatably supporting the output shaft 2 as shown in FIG. 5.

The first embodiment includes two bearings 5. The two bearings 5 are aligned in the axial direction D1 (forward/backward direction) of the output shaft in the cylindrical part 732 of the housing 7. In the first embodiment, the bearing 5 on the front side is a ball bearing 51, and the bearing 5 on the rear side is a slide bearing 52. The ball bearing 51 is disposed between an inner surface of the cylindrical part 732 forward of the projection 76 and the output shaft 2. In contrast, the slide bearing 52 is disposed between the inner surface of the cylindrical part 732 backward of the projection 76 and the output shaft 2.

As shown in FIG. 5, the ball bearing 51 includes an inner ring 511, an outer ring 512, and a plurality of balls 513. The inner ring 511 and the outer ring 512 are circularly annular members. The inner ring 511 is disposed inside the outer ring 512. That is, the inner ring 511 has an outer diameter smaller than an inner diameter of the outer ring 512.

Moreover, the inner ring 511 has an inner diameter substantially equal to an outer diameter of the output shaft 2 or slightly larger than the outer diameter of the output shaft 2. In contrast, the outer ring 512 has an outer diameter substantially equal to an inner diameter of the cylindrical part 732 forward of the projection 76 or slightly smaller than the inner diameter of the cylindrical part 732 forward of the projection 76.

The inner ring 511 has a groove 5111 formed in the outer circumferential surface thereof. Similarly, the outer ring 512 has a groove 5121 formed in the inner circumferential surface thereof. The plurality of balls 513 are sandwiched by the groove 5111 of the inner ring 511 and the groove 5121 of the outer ring 512 at equal intervals.

Thus, when the output shaft 2 rotates, the inner ring 511 rotates together with the output shaft 2, and the plurality of balls 513 roll between the groove 5111 of the inner ring 511 and the groove 5121 of the outer ring 512. In contrast, also when the output shaft 2 rotates, the outer ring 512 does not rotate and is fixed to the cylindrical part 732 of the housing 7. That is, when the output shaft 2 rotates, the inner ring 511 rotates relative to the outer ring 512.

The slide bearing 52 is formed from one circularly annular member. The slide bearing 52 has an inner diameter substantially equal to the outer diameter of the output shaft 2 or slightly larger than the outer diameter of the output shaft 2. In contrast, the slide bearing 52 has an outer diameter substantially equal to the inner diameter of the cylindrical part 732 backward of the projection 76 or slightly smaller than the inner diameter of the cylindrical part 732 backward of the projection 76. Between the slide bearing 52 and the output shaft 2, a lubricant agent such as grease or lubricating oil is applied. Also when the output shaft 2 rotates, the slide bearing 52 does not rotate and is fixed to the cylindrical part 732 of the housing 7.

(1-2-8) Seal Member

The seal member 6 is a disk-shaped plate member. As shown in FIG. 1, the seal member 6 has the through hole 61 into which the output shaft 2 is inserted. That is, the seal member 6 has a circularly annular shape as shown in FIGS. 3 and 4. The seal member 6 has an inner diameter substantially equal to the outer diameter of the output shaft 2. Therefore, the inner circumferential surface 610 of the through hole 61 of the seal member 6 is in contact with the outer circumferential surface 20 of the output shaft 2. In contrast, the seal member 6 has an outer diameter slightly smaller than an inner diameter of the projection 76. Thus, a gap is provided between the seal member 6 and the projection 76 of the housing 7.

The seal member 6 of the first embodiment is made of an oil absorbing material having oil absorptiveness. As used herein, the "oil absorptiveness" is a property of absorbing oil such as grease or lubricating oil. The oil absorbing material is, for example, felt. The seal member 6 formed from the felt has a function of capturing a foreign substance which is about to pass through the seal member 6. Note that the oil absorbing material for the seal member 6 is not limited to the felt but may be unwoven cloth, paper, woven fabric, or knit fabric.

The seal member 6 is disposed in at least one space of spaces each between two adjacent bearings 5 of the plurality of bearings 5. In the first embodiment, the seal member 6 is disposed in a space between the ball bearing 51 and the slide bearing 52 as shown in FIG. 1. More specifically, the seal member 6 is disposed in the space between the ball bearing 51 and the slide bearing 52 such that the inner circumferential surface 610 of the through hole 61 is in contact with the outer circumferential surface 20 of the output shaft 2 as shown in FIG. 1. Therefore, the seal member 6 of the first embodiment rotates together with the output shaft 2. Note that the seal member 6 does not rotate together with the output shaft 2 and may be fixed to the housing 7.

In the first embodiment, the dimension of the seal member 6 in the axial direction D1 is smaller than the dimension of the projection 76 of the housing 7 in the axial direction D1 as shown in FIG. 5. Therefore, the seal member 6 of the first embodiment is spaced from both the ball bearing 51 and the slide bearing 52. That is, in the first embodiment, the seal member 6 is not compressed along the axial direction D1 by the ball bearing 51 and the slide bearing 52. Therefore, there is the advantage that the seal member 6 formed from a felt member efficiently absorbs the lubricant agent which is about to pass through the seal member 6 or efficiently captures the foreign substance which is about to pass through the seal member 6.

The seal member 6 suppresses a foreign substance present outside the housing 7 from entering the housing 7. As used herein, the "foreign substances" are, for example, powder dust such as iron powder or liquid such as rainwater. This configuration provides the advantage of reducing the possibility that the foreign substance causes a failure in, or a malfunction of, the electric tool 1.

The seal member 6 suppresses the lubricant agent present in the housing 7 from leaking out of the housing 7. As used herein, the "lubricant agent" is, for example, grease or lubricating oil and is applied between the slide bearing 52 and the output shaft 2. Moreover, the "lubricant agent" is not limited to an agent applied between the slide bearing 52 and the output shaft 2 but may be an agent applied to the transmission mechanism 4 or the driver 8. That is, a location to which the "lubricant agent" is to be applied is not limited to a particular location in the housing 7. This configuration provides the advantage of reducing the possibility that a work target or a fastening part is stained with the lubricant agent.

(1-2-9) Operating Member

As shown in FIGS. 1 and 2, the operating member 93 protrudes from the grip 74. The operating member 93 receives an operation for controlling the rotation of the rotary shaft 811 of the driver 8. The operation of pulling the operating member 93 can switch on and off the driver 8. Moreover, the rotational velocity of the rotary shaft is adjustable by a pulled amount indicating how deep the operating member 93 is pulled. As the pulled amount increases, the rotational velocity of the rotary shaft increases.

(1-2-10) Controller

The controller 91 rotates or stops the rotary shaft 811 of the driver 8 and controls the rotational velocity of the rotary shaft in accordance with the pulled amount indicating how deep the operating member 93 is pulled.

The controller 91 includes, for example, a microcontroller. The controller 91 can change the rotational velocity of the rotary shaft 811, thereby changing the rotational velocity of the output shaft 2 and the tip tool B1. The controller 91 changes, for example, electric power to be supplied to the driver 8, thereby changing the rotational velocity of the rotary shaft 811.

(1-3) Variations

Variations of the first embodiment described above will be enumerated below. The variations described below may be accordingly combined with each other.

In the first embodiment described above, the bearing 5 on the front side is the ball bearing 51, and the bearing 5 on the rear side is the slide bearing 52. However, both of the two bearings 5 may be ball bearings 51 or may be slide bearings 52.

In the first embodiment described above, the seal member 6 is formed from the felt and thus has both oil absorptiveness and the function of capturing the foreign substance which is about to pass through the seal member 6. However, the seal member 6 may have only oil absorptiveness or may have only the function of capturing the foreign substance.

Moreover, in the first embodiment described above, the seal member 6 is spaced from both the ball bearing 51 and the slide bearing 52. However, the seal member 6 may be spaced from one of the ball bearing 51 and the slide bearing 52 and may be in contact with the other of the ball bearing 51 and the slide bearing 52. That is, the seal member 6 may be spaced from at least one of the ball bearing 51 or the slide bearing 52.

Moreover, in the first embodiment described above, the seal member 6 is not compressed along the axial direction D1 by the ball bearing 51 and the slide bearing 52 but may be compressed along the axial direction D1 by the ball bearing 51 and the slide bearing 52. That is, the seal member 6 may be in contact with both the ball bearing 51 and the slide bearing 52.

Moreover, in the first embodiment described above, the outer diameter of the seal member 6 is slightly smaller than the inner diameter of the projection 76. However, the outer diameter of the seal member 6 may be substantially equal to the inner diameter of the projection 76. That is, the seal member 6 may be in contact with the projection 76 of the housing 7.

In the first embodiment described above, the first part 71 and the third part 73 of the housing 7 are separate components but being the separate components is not essential. The first part 71 and the third part 73 may be formed as a single component.

(2) Second Embodiment

(2-1) Overview

Figure 7:
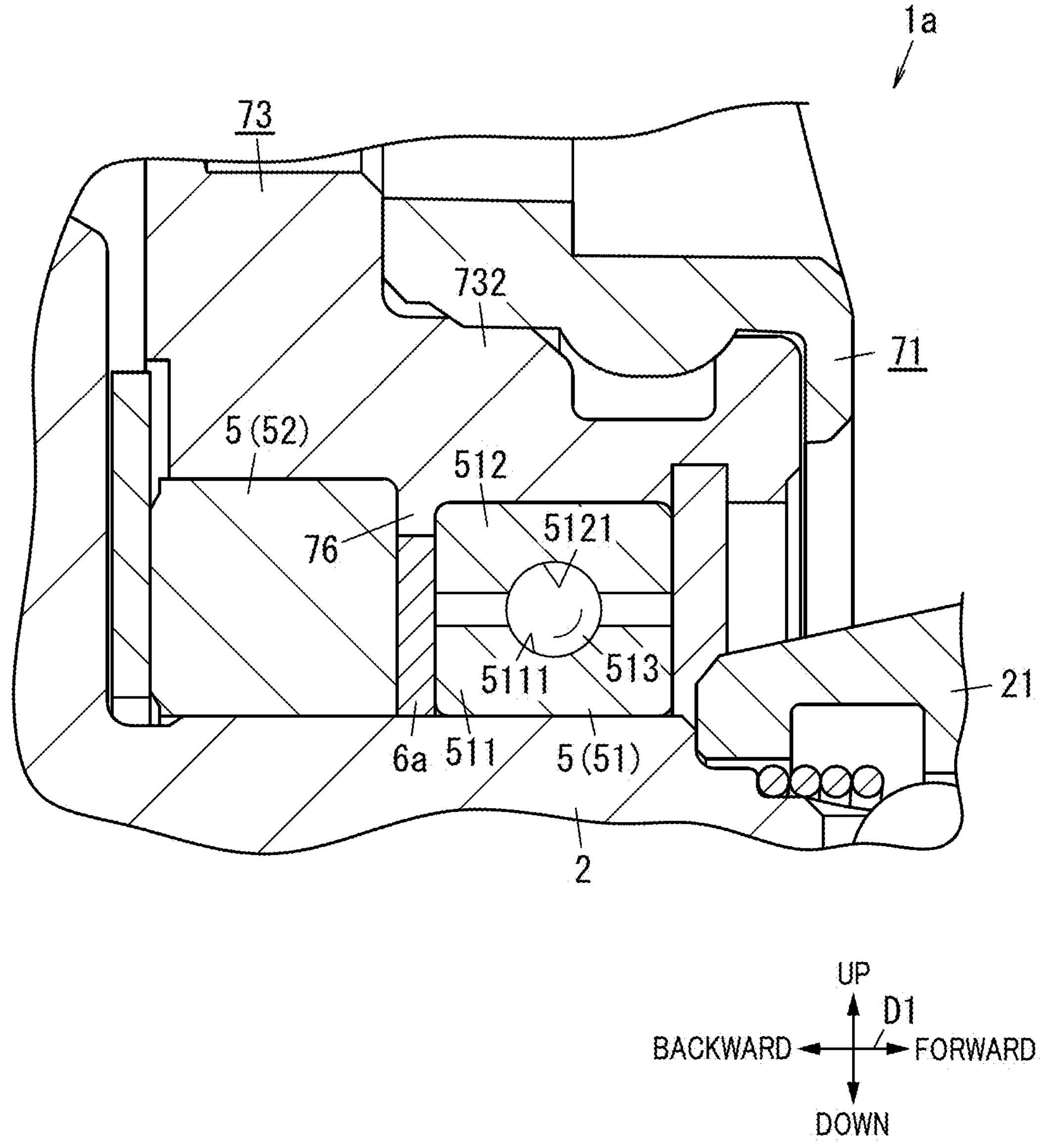
FIG. 7 is an enlarged sectional view of a main part of an electric tool of a variation of the embodiment.

With reference to FIG. 7, an electric tool 1*a* according to a second embodiment will be described below. Components similar to those in the first embodiment are denoted by the same reference signs as those in the first embodiment, and the description thereof is omitted.

The electric tool 1*a* of the second embodiment is different from the electric tool 1 of the first embodiment in that a seal member 6*a* is made of a rubber material.

(2-2) Details

The seal member 6*a* of the second embodiment is made of a rubber material. This configuration provides the effect that the seal member 6*a* can seal between a cylindrical part 732 of a housing 7 and an output shaft 2. Therefore, there is the advantage that the seal member 6*a* can suppress a lubricant agent present in the housing 7 from leaking out of the housing 7 and a foreign substance present outside the housing 7 from entering the housing 7. As used in the present disclosure, the "rubber material" is a material having the property (elasticity) that when a force is applied to the material, the material deforms along the direction of the force thus applied, and the material returns to its original shape when the force causing the deformation is removed. In other words, the "rubber material" is an elastic material.

Similarly to the seal member 6 of the first embodiment, the seal member 6*a* of the second embodiment is a disk-shaped plate member having a through hole 61 into which the output shaft 2 is inserted. That is, the seal member 6*a* has a circularly annular shape. Moreover, the seal member 6*a* has an inner diameter substantially equal to an outer diameter of the output shaft 2. Therefore, an inner circumferential surface 610 of the through hole 61 of the seal member 6*a* is in contact with an outer circumferential surface 20 of the output shaft 2. In contrast, the seal member 6*a* has an outer diameter slightly smaller than an inner diameter of a projection 76. Therefore, a gap is provided between the seal member 6*a* and the projection 76 of the housing 7.

In the second embodiment, the dimension of the seal member 6*a* in an axial direction D1 is greater than the dimension of the projection 76 in the axial direction D1. Therefore, the seal member 6*a* is in contact with each of two adjacent bearings 5. Specifically, the seal member 6*a* of the second embodiment is in contact with each of a ball bearing 51 and a slide bearing 52 as shown in FIG. 7. That is, the seal member 6*a* is held between the ball bearing 51 and the slide bearing 52 along the axial direction D1. The seal member 6*a* held between the ball bearing 51 and the slide bearing 52 is compressed along the axial direction D1. More specifically, the seal member 6*a* is compressed along the axial direction D1 so that the dimension in the axial direction D1 of the seal member 6*a* held between the ball bearing 51 and the slide bearing 52 becomes substantially equal to the dimension in the axial direction D1 of the projection 76. This configuration provides the effect that the seal member 6*a* can further seal between the cylindrical part 732 of the housing 7 and the output shaft 2. Therefore, there is the advantage that the seal member 6*a* can further suppress a lubricant agent present in the housing 7 from leaking out of the housing 7 and a foreign substance present outside the housing 7 from entering the housing 7.

(2-3) Variations

Variations of the second embodiment described above will be enumerated below. The variations described below may be accordingly combined with each other.

The seal member 6*a* may rotate together with the output shaft 2 or does not have to rotate together with the output shaft 2 and may be fixed to the housing 7.

In the second embodiment described above, similarly to the first embodiment, the bearing 5 on the front side is a ball bearing 51, and the bearing 5 on the rear side is a slide bearing 52 as shown in FIG. 6. However, both of the two bearings 5 may be ball bearings 51 or may be slide bearings 52. When both the two bearings 5 are the ball bearing 51, the seal member 6*a* desirably rotate together with the output shaft 2. In contrast, when both the two bearings 5 are the slide bearings 52, the seal member 6*a* does not rotate together with the output shaft 2 and is desirably fixed to the housing 7.

(Summary)

An electric tool (1, 1*a*) of a first aspect includes an output shaft (2), a drive shaft (3), a transmission mechanism (4), a plurality of bearings (5), and a seal member (6, 6*a*). The output shaft (2) includes a holder (21) configured to hold a tip tool (B1). The drive shaft (3) is configured to be rotated by a driver (8). The transmission mechanism (4) is disposed between the drive shaft (3) and the output shaft (2) to transmit rotation of the drive shaft (3) to the output shaft (2). The plurality of bearings (5) are aligned in an axial direction (D1) of the output shaft (2) to rotatably support the output shaft (2). The seal member (6, 6*a*) has a through hole (61) in which the output shaft (2) is inserted. The seal member (6, 6*a*) is disposed, in at least one space of spaces each between two adjacent bearings (5) of the plurality of bearings (5), such that an inner circumferential surface (610) of the through hole (61) is in contact with an outer circumferential surface (20) of the output shaft (2).

This aspect provides the advantage that the seal member (6, 6*a*) has high durability.

An electric tool (1, 1*a*) of a second aspect referring to the first aspect further includes a housing (7) in which at least part of the output shaft (2) is housed. The housing (7) supports the plurality of bearings (5).

This aspect provides the advantage that the seal member (6, 6*a*) can be suppressed from being abraded by the output shaft (2).

In an electric tool (1, 1*a*) of a third aspect referring to the second aspect, the seal member (6, 6*a*) is configured to suppress a foreign substance present outside the housing (7) from entering the housing (7).

This aspect provides the advantage of reducing the possibility that the foreign substance causes a failure in, or a malfunction of, the electric tool (1, 1*a*).

In an electric tool (1, 1*a*) of a fourth aspect referring to the second aspect, the seal member (6, 6*a*) is configured to suppress a lubricant agent present in the housing (7) from leaking out of the housing (7).

This aspect provides the advantage of reducing the possibility that a work target or a fastening part from being stained with the lubricant agent.

In an electric tool (1, 1*a*) of a fifth aspect referring to any one of the first to fourth aspects, the transmission mechanism (4) includes a hammer (41) and an anvil (42). The hammer (41) is fitted to an outer circumferential surface (20) of the drive shaft (3) such that the hammer (41) is rotatable and is movable forward and backward, the hammer (41) including a plurality of hammer projections (411). The anvil (42) includes a plurality of anvil projections (421) engageable with the plurality of hammer projections (411), the anvil (42) being mechanically connected to the output shaft (2).

This aspect provides the advantage that the seal member (6, 6*a*) of the impact electric tool can be suppressed from being abraded.

In an electric tool (1) of a sixth aspect referring to any one of the first to fifth aspects, the seal member (6) is made of an oil absorbing material having oil absorptiveness.

This aspect provides the advantage that oil, such as grease or lubricating oil, present in the housing (7) can be absorbed.

In an electric tool (1) of a seventh aspect referring to the sixth aspect, the oil absorbing material is felt.

This aspect provides the advantage that the foreign substance which is about to pass though the seal member (6) can be captured.

An electric tool (1) of an eighth aspect referring to the seventh aspect further includes a housing (7) in which at least part of the output shaft (2) is housed. The housing (7) includes a projection (76) located in the at least one space in which the seal member (6) is disposed.

This aspect provides the advantages that the seal member (6) is easily provided.

In an electric tool (1) of a ninth aspect referring to the eighth aspect, a dimension of the seal member (6) in the axial direction (D1) is smaller than a dimension of the projection (76) in the axial direction (D1).

This aspect provides the advantage that the seal member (6) can efficiently absorb the oil or efficiently capture the foreign substance.

In an electric tool (1*a*) of a tenth aspect referring to any one of the first to fifth aspects, the seal member (6*a*) is made of a rubber material.

This aspect provides the advantage that the seal member (6*a*) can seal between the housing (7) and the output shaft (2).

An electric tool (1*a*) of an eleventh aspect referring to the tenth aspect further includes a housing (7) in which at least part of the output shaft (2) is housed. The housing (7) has a projection (76) located in the at least one space in which the seal member (6*a*) is disposed.

This aspect provides the advantage that the seal member (6*a*) is easily provided.

In an electric tool (1*a*) of a twelfth aspect referring to the eleventh aspect, a dimension of the seal member (6*a*) in the axial direction (D1) is greater than a dimension of the projection (76) in the axial direction (D1).

This aspect provides the advantage that the seal member (6*a*) can further seal between the housing (7) and the output shaft (2).

An electric tool (1*a*) of a thirteenth aspect referring to the twelfth aspect, the seal member (6*a*) is in contact with each of the two adjacent bearings (5).

This aspect provides the advantage that the seal member (6*a*) can further seal between the housing (7) and the output shaft (2).

Note that the first and second embodiments described above are mere examples of the present invention. Therefore, the present invention is not limited to the first and second embodiments described above. Even in configurations other than that illustrated in these embodiments, various modifications may be made depending on design and the like without departing from the technical idea of the present invention.

REFERENCE SIGNS LIST

1, 1*a* Electric Tool
2 Output Shaft
20 Outer Circumferential Surface
21 Holder
3 Drive Shaft
31 Groove
4 Transmission Mechanism
41 Hammer
411 Hammer Projection
42 Anvil
421 Anvil Projection
5 Bearing
51 Ball Bearing
52 Slide Bearing
6, 6*a* Seal Member
61 Through Hole
610 Inner Circumferential Surface
7 Housing
76 Projection
B1 Tip Tool
D1 Axial Direction

The invention claimed is:

1. An electric tool comprising:

an output shaft including a holder configured to hold a tip tool;

a drive shaft configured to be rotated by a driver;

a transmission mechanism disposed between the drive shaft and the output shaft to transmit rotation of the drive shaft to the output shaft;

a plurality of bearings aligned in an axial direction of the output shaft to rotatably support the output shaft; and a seal member having a through hole in which the output shaft is inserted, the seal member being disposed, in at least one space of spaces each between two adjacent bearings of the plurality of bearings, such that an inner circumferential surface of the through hole is in contact with an outer circumferential surface of the output shaft.

2. The electric tool of claim 1, further comprising: a housing in which at least part of the output shaft is housed, wherein the housing supports the plurality of bearings.

3. The electric tool of claim 2, wherein the seal member is configured to suppress a foreign substance present outside the housing from entering the housing.

4. The electric tool of claim 2, wherein the seal member is configured to suppress a lubricant agent present in the housing from leaking out of the housing.

5. The electric tool of claim 2, wherein the transmission mechanism includes a hammer fitted to an outer circumferential surface of the drive shaft such that the hammer is rotatable and is movable forward and backward, the hammer including a plurality of hammer projections and an anvil including a plurality of anvil projections engageable with the plurality of hammer projections, the anvil being mechanically connected to the output shaft.

6. The electric tool of claim 2, wherein the seal member is made of an oil absorbing material having oil absorptiveness.

7. The electric tool of claim 6, wherein the oil absorbing material is felt.

8. The electric tool of claim 7, further comprising a housing in which at least part of the output shaft is housed, wherein the housing includes a projection located in the at least one space in which the seal member is disposed.

9. The electric tool of claim 8, wherein a dimension of the seal member in the axial direction is smaller than a dimension of the projection in the axial direction.

10. The electric tool of claim 2, wherein the seal member is made of a rubber material.

11. The electric tool of claim 10, further comprising a housing in which at least part of the output shaft is housed, wherein the housing has a projection located in the at least one space in which the seal member is disposed.

12. The electric tool of claim 1, wherein the transmission mechanism includes a hammer fitted to an outer circumferential surface of the drive shaft such that the hammer is rotatable and is movable forward and backward, the hammer including a plurality of hammer projections and an anvil including a plurality of anvil projections engageable with the plurality of hammer projections, the anvil being mechanically connected to the output shaft.

13. The electric tool of claim 1, wherein the seal member is made of an oil absorbing material having oil absorptiveness.

14. The electric tool of claim 13, wherein the oil absorbing material is felt.

15. The electric tool of claim 14, further comprising a housing in which at least part of the output shaft is housed, wherein the housing includes a projection located in the at least one space in which the seal member is disposed.

16. The electric tool of claim 15, wherein a dimension of the seal member in the axial direction is smaller than a dimension of the projection in the axial direction.

17. The electric tool of claim 1, wherein the seal member is made of a rubber material.

18. The electric tool of claim 17, further comprising a housing in which at least part of the output shaft is housed, wherein the housing has a projection located in the at least one space in which the seal member is disposed.

19. The electric tool of claim 18, wherein a dimension of the seal member in the axial direction is greater than a dimension of the projection in the axial direction.

20. The electric tool of claim 19, wherein the seal member is in contact with each of the two adjacent bearings.

* * * * *